(12) United States Patent
Takae et al.

(10) Patent No.: US 10,137,828 B1
(45) Date of Patent: Nov. 27, 2018

(54) VEHICULAR NOTIFICATION DEVICE

(71) Applicant: Nissan Motor Co., Ltd., Yokohama-shi, Kanagawa (JP)

(72) Inventors: Yasuhiko Takae, Kanagawa (JP); Nariaki Etori, Kanagawa (JP); Akira Morimoto, Kanagawa (JP); Takahiro Yano, Kanagawa (JP); Tatsuya Shino, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/769,244

(22) PCT Filed: Oct. 22, 2015

(86) PCT No.: PCT/JP2015/079887
§ 371 (c)(1),
(2) Date: Apr. 18, 2018

(87) PCT Pub. No.: WO2017/068693
PCT Pub. Date: Apr. 27, 2017

(51) Int. Cl.
*B60Q 1/26* (2006.01)
*B60Q 1/50* (2006.01)
*G06K 9/00* (2006.01)
*B60Q 1/00* (2006.01)

(52) U.S. Cl.
CPC ............ *B60Q 1/50* (2013.01); *B60Q 1/0035* (2013.01); *B60Q 1/2607* (2013.01); *B60Q 1/2611* (2013.01); *G06K 9/00805* (2013.01)

(58) Field of Classification Search
CPC ...... B60Q 1/50; B60Q 1/2607; B60Q 1/0035; B60Q 1/2611; B60Q 1/085; B60Q 1/525; B60Q 2400/50; B60Q 2300/122; B60Q 2300/45; B60Q 2300/112; B60Q 9/008; G06K 9/00805; B60T 2210/32
USPC ................ 340/468, 435, 436, 903; 348/148; 701/301
See application file for complete search history.

(56) References Cited

U.S. PATENT DOCUMENTS

| | | | | |
|---|---|---|---|---|
| 5,255,164 A | * | 10/1993 | Eidelman | B60Q 1/2611 340/475 |
| 7,791,458 B2 | * | 9/2010 | Shimaoka | B60Q 1/085 340/435 |
| 9,868,387 B2 | * | 1/2018 | Salter | H05B 37/0218 |
| 2007/0080796 A1 | * | 4/2007 | Wang | B60Q 1/326 340/472 |
| 2011/0140919 A1 | | 6/2011 | Hara et al. | |
| 2012/0031939 A1 | * | 2/2012 | Jutila | B60Q 1/24 224/326 |

(Continued)

FOREIGN PATENT DOCUMENTS

| | | |
|---|---|---|
| JP | H7251691 A | 10/1995 |
| JP | 2008230568 A | 10/2008 |

(Continued)

*Primary Examiner* — Anh V La
(74) *Attorney, Agent, or Firm* — Young Basile Hanlon & MacFarlane, P.C.

(57) ABSTRACT

The vehicular notification device comprises luminescent devices provided on the roof of a vehicle and a notification control device configured to control the luminescent devices to emit light when a person existing around the vehicle is detected. The luminescent devices are provided so as to extend in the vehicle's front-back direction on both sides in the vehicle's width direction of the roof.

10 Claims, 14 Drawing Sheets

(56) References Cited

U.S. PATENT DOCUMENTS

2014/0232567 A1  8/2014  Hara et al.
2016/0052445 A1  2/2016  Huang

FOREIGN PATENT DOCUMENTS

| JP | 2011123636 A | 6/2011 |
| JP | 2011168086 A | 9/2011 |
| JP | 3194670 U | 12/2014 |
| JP | 2015143093 A | 8/2015 |
| KR | 20140086304 A | 7/2014 |

* cited by examiner

VEHICULAR NOTIFICATION DEVICE

TECHNICAL FIELD

The present invention relates to a vehicular notification device.

BACKGROUND

To notify pedestrians recognized by the vehicle side that the vehicle side recognizes the pedestrians, a notification device for pedestrians is known which illuminates a predetermined pattern on the road when a pedestrian is detected (see Japanese Patent Application JP2015-143093A).

The notification device for pedestrians as disclosed in Japanese Patent Application JP2015-143093A has a problem in that it cannot notify a person existing on a side of the vehicle or behind the vehicle because the range in which the predetermined pattern can be illuminated is limited to an area located ahead of the vehicle.

SUMMARY

A problem to be solved by the present invention is to provide a vehicular notification device that can notify not only a person existing ahead of the vehicle but also a person existing on a side of the vehicle or behind the vehicle that the vehicle side recognizes the person.

The present invention solves the above problem by controlling a luminescent device provided on the roof of a vehicle to emit light when detecting a person existing around the vehicle.

According to the present invention, the luminescent device is provided on the roof of a vehicle and, therefore, not only a person existing ahead of the vehicle but also a person existing on a side of the vehicle or behind the vehicle can be notified that the vehicle side recognizes the person.

BRIEF DESCRIPTION OF THE DRAWINGS

FIG. 6 is a plan view illustrating an example of a situation in which the luminescent devices are turned on;

DETAILED DESCRIPTION OF THE EMBODIMENTS

Hereinafter, one or more embodiments of the present invention will be described with reference to the drawings. In the embodiments, a travel control apparatus equipped in a vehicle will be exemplified for description.

Figure 1:
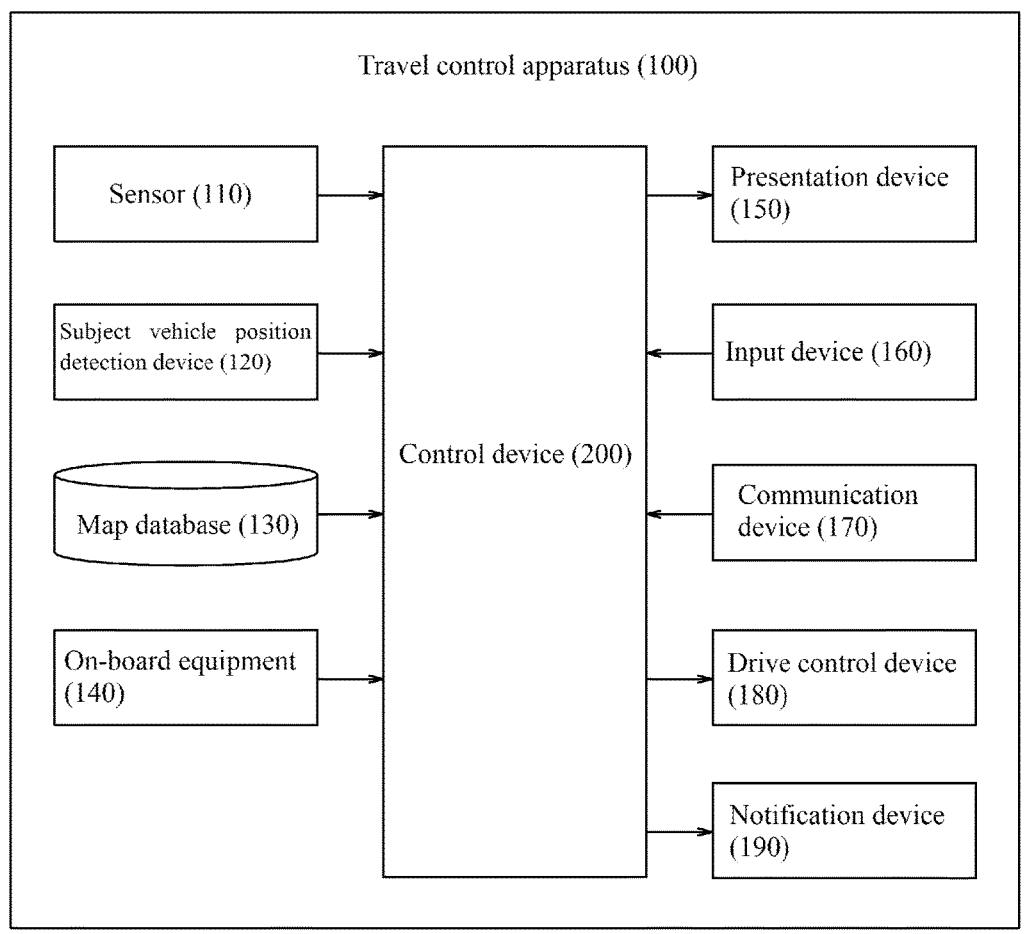
FIG. 1 is a block diagram illustrating the configuration of a travel control apparatus according to one or more embodiments of the present invention.
Figure 2:
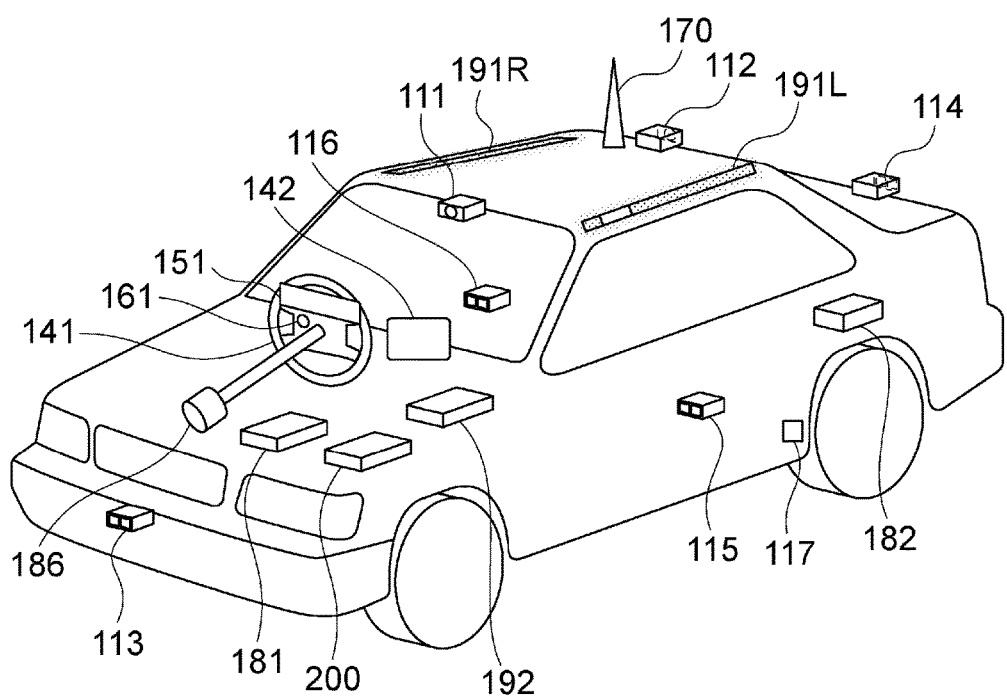
FIG. 2 is a perspective view illustrating the arrangement of components of the travel control apparatus according to one or more embodiments of the present invention.
Figure 3:
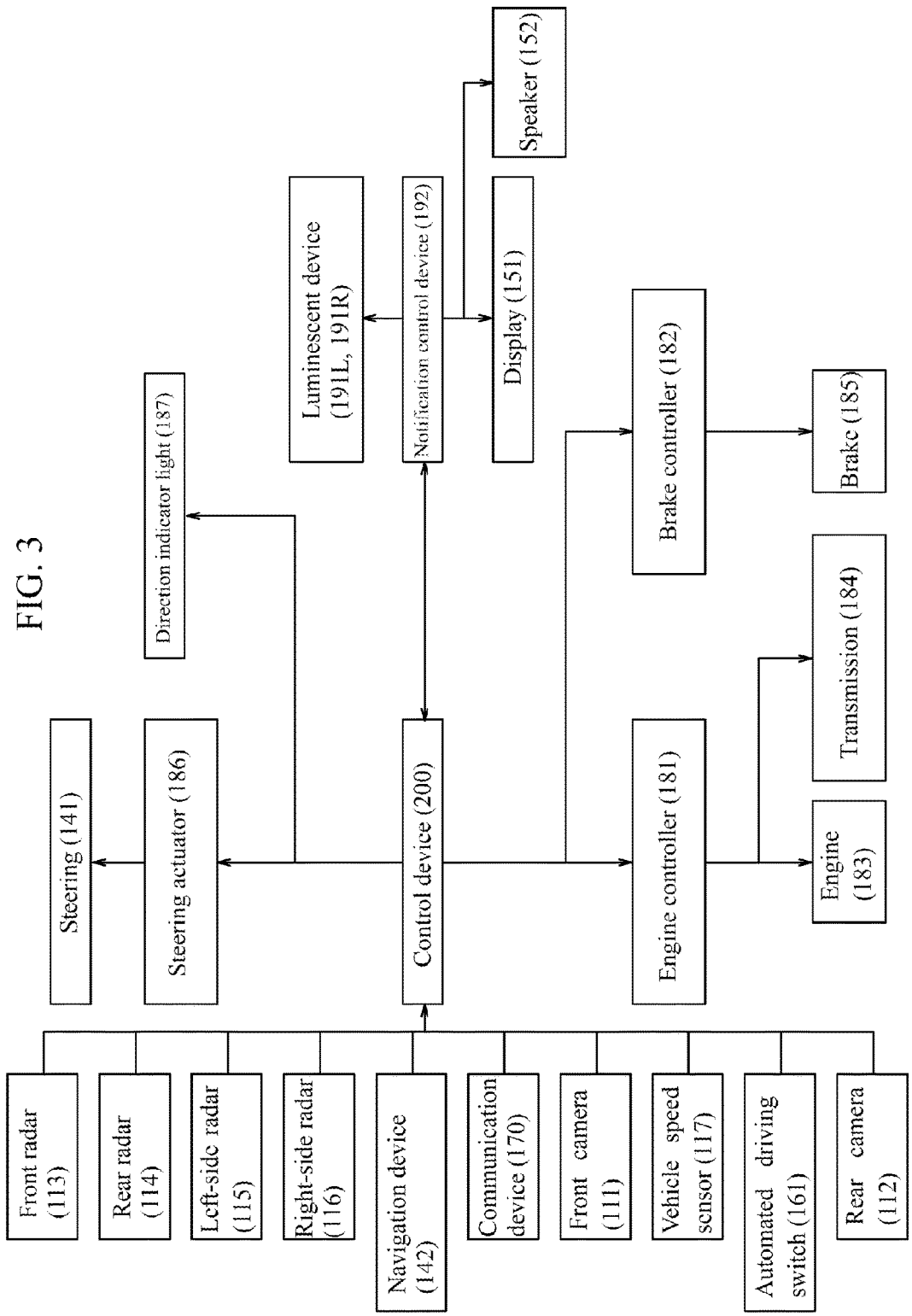
FIG. 3 is a block diagram illustrating details of the configuration of the travel control apparatus according to one or more embodiments of the present invention.

FIG. 1 is a block diagram illustrating the configuration of a travel control apparatus 100 according to one or more embodiments of the present invention. FIG. 2 is a perspective view illustrating the arrangement of components of the travel control apparatus 100 according to one or more embodiments of the present invention. FIG. 3 is a block diagram illustrating details of the configuration of the travel control apparatus 100 according to one or more embodiments of the present invention.

As illustrated in FIG. 1, the travel control apparatus 100 according to one or more embodiments of the present invention comprises a sensor 110, a subject vehicle position detection device 120, a map database 130, on-board equipment 140, a presentation device 150, an input device 160, a communication device 170, a drive control device 180, a notification device 190, and a control device 200. These devices are connected to one another via a controller area network (CAN) or other in-vehicle LAN for mutually exchanging information.

The sensor 110 detects the travel state of a subject vehicle and situations around the subject vehicle. Examples of the sensor 110 include a front camera 111 that captures images ahead of the subject vehicle, a rear camera 112 that captures images behind the subject vehicle, a front radar 113 that detects obstacles ahead of the subject vehicle, a rear radar 114 that detects obstacles behind the subject vehicle, a left-side radar 115 and a right-side radar 116 that detect obstacles existing at sides of the subject vehicle, a vehicle speed sensor 117 that detects the vehicle speed of the subject vehicle, and an in-vehicle camera (not illustrated) that captures images of the driver. The sensor 110 may be configured using one of the above-described multiple sensors or may also be configured using a combination of two or more sensors. The detection results of the sensor 110 are output to the control device 200.

The subject vehicle position detection device 120 is composed of a GPS unit and a gyro-sensor (which are not illustrated), the vehicle speed sensor 117, and other necessary components. The subject vehicle position detection device 120 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor 117. The positional information of the target vehicle detected by the subject vehicle position detection device 120 is output to the control device 200.

The map database 130 stores map information that includes positional information of various facilities and specific points. Specifically, the map database 130 stores positional information of merging points, branching points, tollgates, positions at which the number of lanes decreases, service areas (SA)/parking areas (PA), etc. together with the map information. The control device 200 can refer to the map information stored in the map database.

The on-board equipment 140 includes various modules equipped in the vehicle and can be operated by the driver. Examples of such on-board equipment include a steering 141, a navigation device 142, an accelerator pedal, a brake pedal, an audio device, an air conditioner, a hands-free switch, power windows, wipers, lights, direction indicators, and a horn (not illustrated). When the driver operates the on-board equipment 140, its information is output to the control device 200.

The presentation device 150 may be, for example, a device such as a display of the navigation device 142, a display incorporated in a rearview mirror, a head-up display projected on a windshield, a display 151 incorporated in a meter unit, and a speaker 152 of an audio device. The presentation device 150 can notify the driver of notification information, which will be described later, under the control by the control device 200.

The input device 160 may be, for example, a device such as a dial switch that allows for input by the driver's hand operation, a touch panel disposed on a display screen, a microphone (not illustrated) that allows for input by the driver's voice, and an automated driving switch 161. In one or more embodiments of the present invention, the driver can operate the input device 160 thereby to input response information in response to the notification information which is notified by the presentation device 150. For example, in one or more embodiments of the present invention, the switch of a direction indicator or other on-vehicle device can also be used as the input device 160, and in response to a query as to whether or not the control device 200 is to automatically change lanes, the driver can turn on the switch of the direction indicator thereby to input permission to change lanes. The response information input via the input device 160 is output to the control device 200.

The communication device 170 communicates with communication equipment located outside the vehicle. For example, the communication device 170 performs vehicle-to-vehicle communication with another vehicle, performs road-to-vehicle communication with equipment provided at a road shoulder, or performs wireless communication with an information server provided outside the vehicle and can thereby acquire various items of information from the external equipment. The information acquired by the communication device is output to the control device 200.

The drive control device 180 controls travel of the subject vehicle. For example, when the subject vehicle follows a preceding vehicle (this operation is referred to as "follow-up travel control," hereinafter), the drive control device 180 controls the operation of a drive mechanism (which includes the operation of an engine 183 and a transmission 184 in the case of an engine car and the operation of an electric motor and a transmission in the case of an electric car and further includes the torque distribution between an engine and an electric motor in the case of a hybrid car) and the operation of a brake 185 to achieve the acceleration, deceleration and vehicle speed so that the distance between the subject vehicle and the preceding vehicle can be maintained at a constant distance. In the case of an engine car, the drive control device 180 includes an engine controller 181 that controls the operation of the engine 183 and transmission 184. The drive control device 180 further includes a brake controller 182 that controls the operation of the brake 185.

When the subject vehicle performs lane change such as overtaking of a preceding vehicle (this operation is referred to as "lane change control," hereinafter), the drive control device 180 controls the operation of a steering actuator 186 to control the operation of wheels and thereby executes the turning control of the subject vehicle. When performing the lane change control, the drive control device 180 blinks a direction indicator light 187. The drive control device 180 controls travel of the subject vehicle in accordance with commands from the control device 200, which will be described later. Other well-known methods can also be employed as a travel control method performed by the drive control device 180.

The notification device 190 notifies pedestrians, drivers of cars, etc. existing around the subject vehicle that the vehicle side recognizes the pedestrians etc. The notification device 190 includes luminescent devices 191L and 191R and a notification control device 192. The luminescent device 191L is provided at the left end of the roof of the vehicle and the luminescent device 191R is provided at the right end of the roof of the vehicle.

The notification control device 192 is composed of a read only memory (ROM) that stores programs for notifying pedestrians etc. that the vehicle side recognizes the pedestrians etc., a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or other appropriate component can also be used as the operation circuit.

The notification control device 192 executes the programs stored in the ROM using the CPU thereby to achieve a notification function of notifying pedestrians etc. that the vehicle side recognizes the pedestrians etc. The notification function will be described later.

The control device 200 is composed of a ROM that stores programs for controlling travel of the subject vehicle, a CPU that executes the programs stored in the ROM, and a RAM that serves as an accessible storage device. As substitute for or in addition to the CPU, an MPU, a DSP, an ASIC, an FPGA, or other appropriate component can also be used as the operation circuit.

The control device 200 executes the programs stored in the ROM using the CPU thereby to achieve a travel information acquisition function of acquiring information about a travel state of the subject vehicle, a travel control function of controlling travel of the subject vehicle, and a surrounding situation information acquisition function of acquiring information about the situation around the subject vehicle. These functions of the control device 200 will be described below.

The control device 200 uses the travel information acquisition function to acquire the travel information about the travel state of the subject vehicle. For example, the travel information acquisition function can serve to acquire the external image information around the vehicle captured by the front camera 111 and the rear camera 112 and the detection results obtained by the front radar 113, the rear radar 114, the left-side radar 115, and the right-side radar 116 as the travel information. The travel information acquisition function can also serve to acquire the vehicle speed information of the subject vehicle detected by the vehicle speed sensor 117 and the image information of the driver's face captured by the in-vehicle camera as the travel information.

The travel information acquisition function can serve further to acquire information on the current position of the subject vehicle from the subject vehicle position detection device 120 as the travel information and also to acquire positional information of merging points, branching points, tollgates, positions at which the number of lanes decreases, service areas (SA)/parking areas (PA), etc. from the map database 130 as the travel information. In addition, the travel information acquisition function can serve to acquire information on the operation of the on-board equipment 140 performed by the driver from the on-board equipment 140 as the travel information.

The control device 200 uses the travel control function to control travel of the subject vehicle. For example, the travel control function serves to detect lane marks of a lane in which the subject vehicle travels (also referred to as a "subject vehicle lane," hereinafter) on the basis of the detection results from the sensor 110 and perform lane keeping control to control a travel position of the subject vehicle in the road width direction so that the subject vehicle travels in the subject vehicle lane. In this case, the travel control function can serve to allow the drive control device 180 to control the operation of the steering actuator 186 and the like so that the subject vehicle travels at an appropriate travel position. In addition or alternatively, the travel control function can serve to perform the follow-up travel control to automatically follow a preceding vehicle with a certain distance from the preceding vehicle. In this case, the travel control function can serve to allow the drive control device 180 to control the operation of the drive mechanism, such as the engine 183, the transmission 184, and the brake 185, so that the subject vehicle travels with a constant distance between the subject vehicle and the preceding vehicle. In the following description, the automated travel control will be described as including the lane keeping control and the follow-up travel control.

The control device 200 uses the surrounding situation information acquisition function to acquire surrounding situation information about the situation around the subject vehicle, such as the presence or absence of pedestrians around the subject vehicle. For example, the surrounding situation information acquisition function can serve to acquire image information outside the vehicle captured by the front camera 111 and the rear camera 112 and detection results obtained by the front radar 113, the rear radar 114, the left-side radar 115, and the right-side radar 116 as the surrounding situation information.

Figure 4:
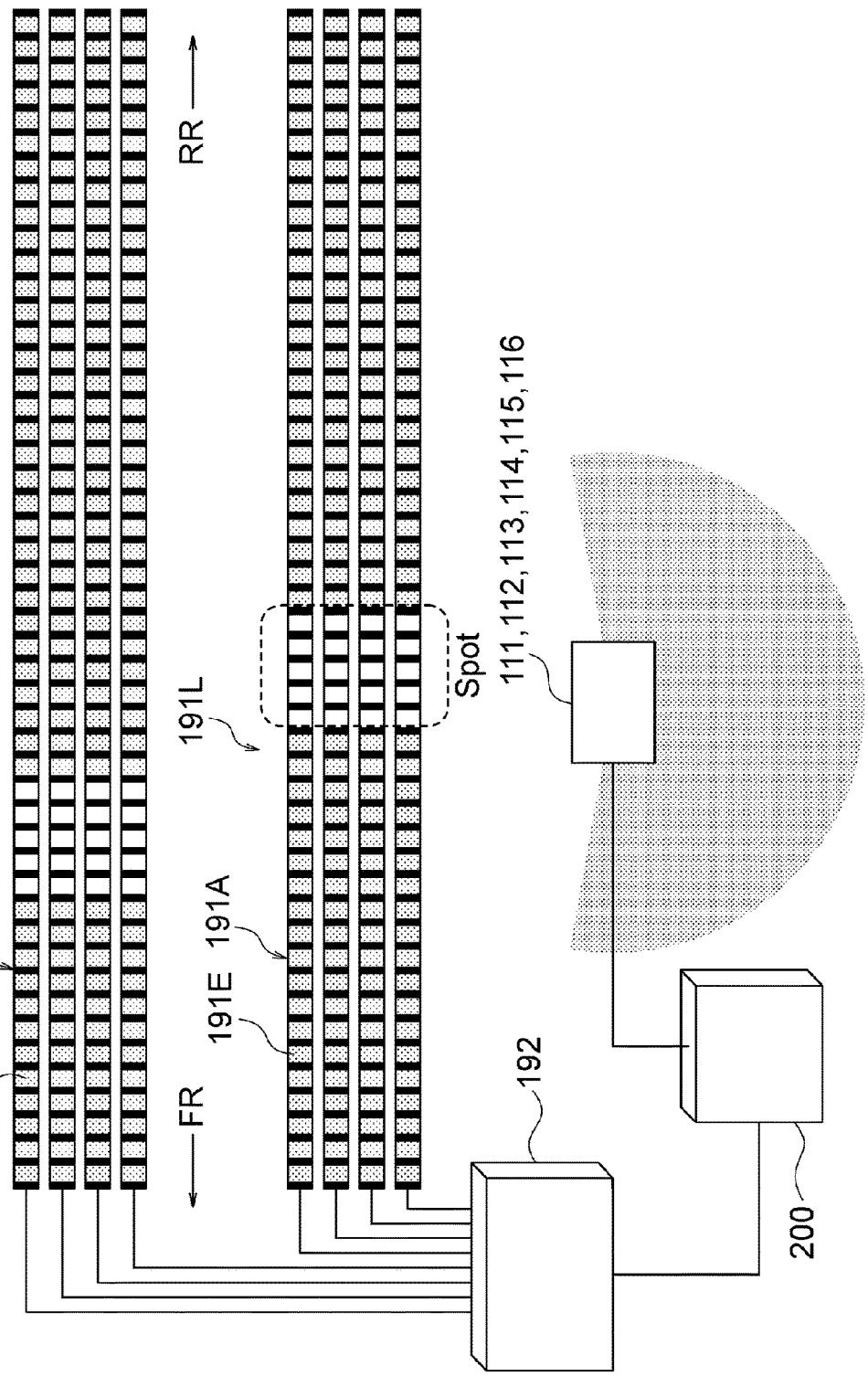
FIG. 4 is a diagram illustrating the configuration of a notification device according to one or more embodiments of the present invention.

FIG. 4 is a diagram illustrating the configuration of the notification device 190. As illustrated in FIG. 4, each of the luminescent devices 191L and 191R comprises a plurality of light-emitting element arrays 191A (e.g. four arrays as illustrated) that are arranged parallel to one another. The light-emitting element arrays 191A of the luminescent device 191L are arranged to extend in the vehicle's front-back direction along the left edge of the vehicle's roof while the light-emitting element arrays 191A of the luminescent device 191R are arranged to extend in the vehicle's front-back direction along the right edge of the vehicle's roof.

The front end part of each light-emitting element array 191A of the right and left luminescent devices 191L and 191R is disposed at the front end part of the vehicle's roof while the rear end part of each light-emitting element array 191A of the right and left luminescent devices 191L and 191R is disposed at the rear end part of the vehicle's roof. Examples of light-emitting elements 191E that constitute each light-emitting element array 191A include light-emitting diode (LED) elements and organic electroluminescence (EL) elements. Here, the light-emitting elements 191E can emit light in a plurality of colors including green and white.

In the notification device 190, the surrounding situation information, such as image information outside the vehicle captured by the front camera 111 and the rear camera 112 and detection results obtained by the front radar 113, the rear radar 114, the left-side radar 115, and the right-side radar 116, is input to the notification control device 192 via the control device 200. The notification control device 192 achieves the above-described notification function on the basis of the surrounding situation information thus input.

The notification function of the notification control device 192 will be described below.

The notification function of the notification control device 192 includes a function of detecting pedestrians etc. that serves to detect pedestrians, bicycles, pedestrian crossings, pedestrian crossing signs, etc. existing around the subject vehicle on the basis of the input surrounding situation information, a light emission control function of controlling light emission of the luminescent devices 191L and 191R, and a display function of controlling the display 151 to display the luminescent state of the luminescent devices 191L and 191R and the detection state of pedestrians etc. The function of detecting pedestrians etc. is a function of detecting the presence or absence and positions of pedestrians, riders of bicycles and the like, pedestrian crossings, pedestrian crossing signs, etc. on the basis of the input surrounding situation information.

The function of detecting pedestrians etc. serves to detect the positions of pedestrians, bicycles and the like existing ahead of the vehicle, pedestrian crossings, pedestrian crossing signs, etc. on the basis of the image information captured by the front camera 111 ahead of the vehicle and the detection results detected by the front radar 113 ahead of the vehicle. In addition, or alternatively, the function of detecting pedestrians etc. serves to detect the positions of pedestrians and the like existing on both sides of the vehicle on the basis of the detection results detected by the left-side radar 115 and the right-side radar 116. In addition, or alternatively, the function of detecting pedestrians etc. serves to detect the positions of pedestrians and the like existing behind the vehicle on the basis of the image information captured by the rear camera 112 behind the vehicle and the detection results detected by the rear radar 114 behind the vehicle.

The light emission control function of the notification control device 192 is a function of controlling ON/OFF and the luminescent state of the luminescent devices 191L and 191R in accordance with the presence or absence and positions of pedestrians and the like, pedestrian crossings, pedestrian crossing signs, etc. detected using the function of detecting pedestrians etc. The light emission control function serves to control all the light-emitting elements 191E of all the light-emitting element arrays 191A of the luminescent devices 191L and 191R to emit light when a pedestrian or the like is detected using the function of detecting pedestrians etc. Here, the light emission control function serves to control a part of the light-emitting elements 191E of the luminescent devices 191L and 191R to emit light in a color (e.g. white) different from the color of other parts (e.g. green) in accordance with the position of a pedestrian or the like detected by the function of detecting pedestrians etc. In addition or alternatively, the light emission control function serves to control the light-emitting elements 191E at a plurality of sites of the luminescent devices 191L and 191R to emit light in a color (e.g. white) different from the color of other sites (e.g. green) in accordance with the number of pedestrians etc. detected by the function of detecting pedestrians etc.

Figure 5:
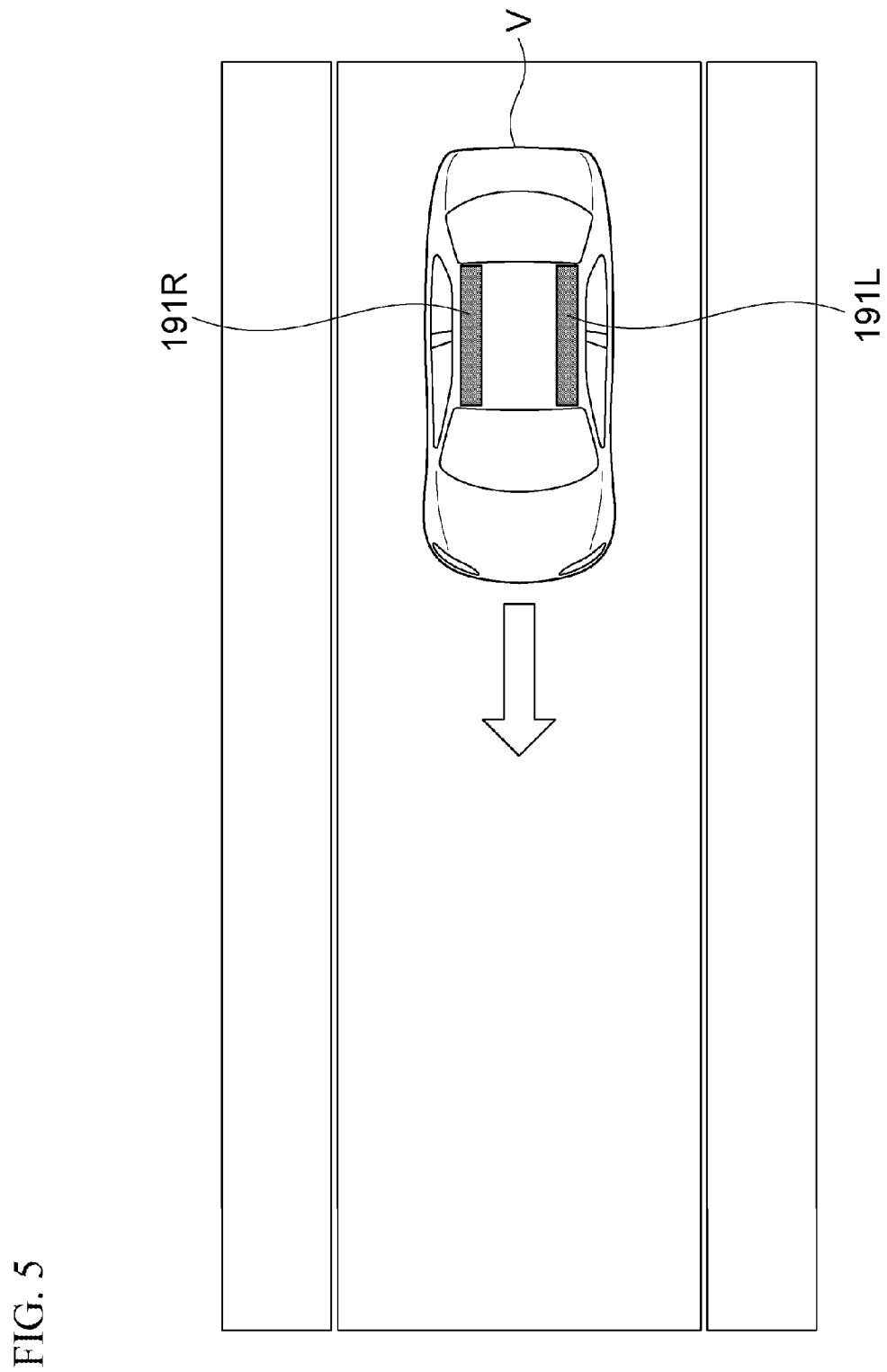
FIG. 5 is a plan view illustrating an example of a situation in which luminescent devices are turned off.

FIG. 5 is a plan view illustrating an example of a situation in which the luminescent devices 191L and 191R are turned off. As illustrated in FIG. 5, when no pedestrians, riders of bicycles, etc. exist around the subject vehicle V, the notification control device 192 uses the light emission control function to turn off all the light-emitting elements 191E of the luminescent devices 191L and 191R.

Figure 6:
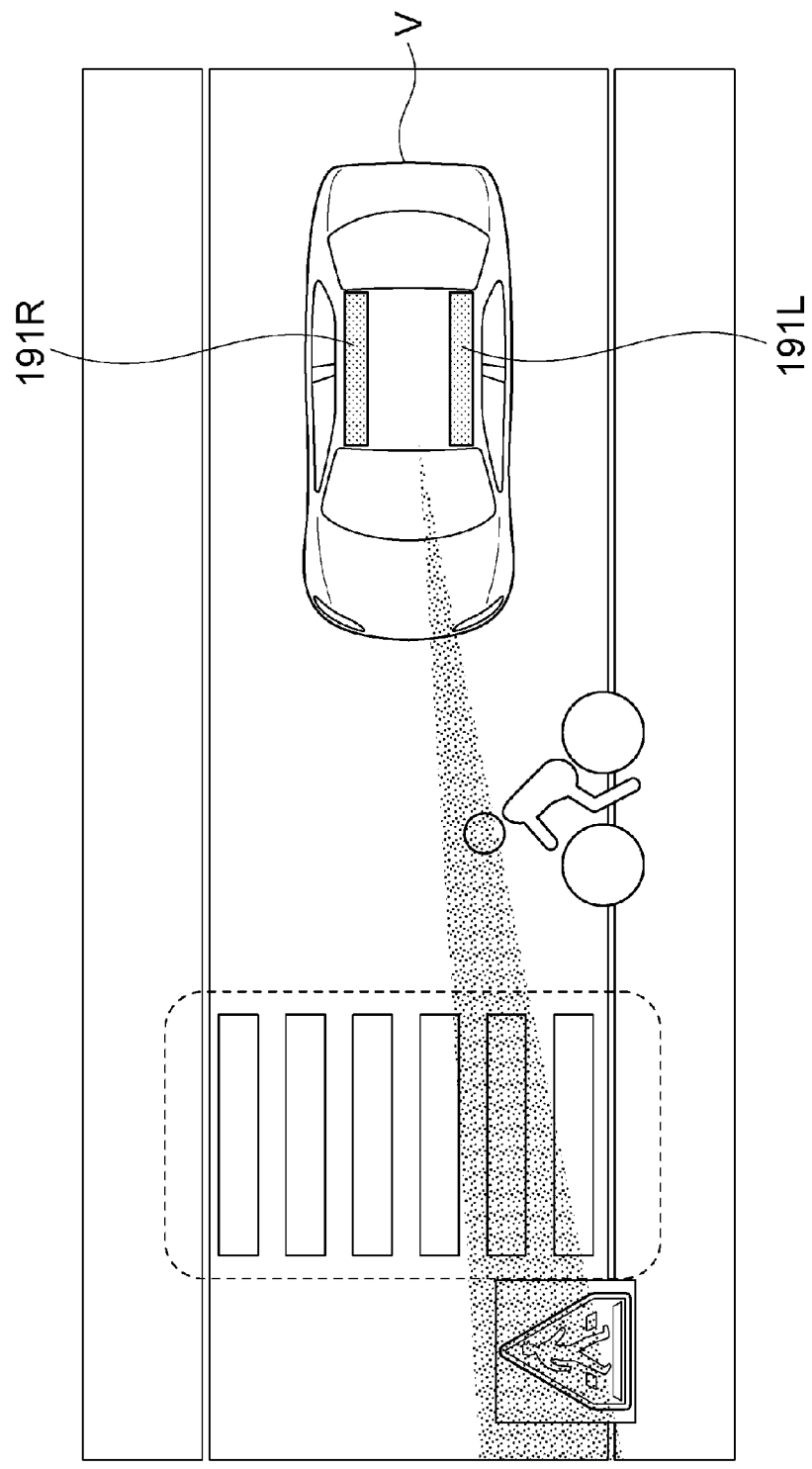

FIG. 6 is a plan view illustrating an example of a situation in which the luminescent devices 191L and 191R are turned on. As illustrated in FIG. 6, when a bicycle stopping on the left side ahead of the subject vehicle V traveling exists, the notification control device 192 uses the function of detecting pedestrians etc. to detect the existence of the bicycle and detect that the bicycle exists on the left side ahead of the subject vehicle V. When a pedestrian crossing and a pedestrian crossing sign exist ahead of the subject vehicle V traveling, the notification control device 192 uses the function of detecting pedestrians etc. to detect the pedestrian crossing and the pedestrian crossing sign. In such cases, the notification control device 192 uses the light emission control function to turn on all the light-emitting elements 191E of the luminescent devices 191L and 191R. Here, when the luminescent devices 191L and 191R changes from OFF to ON, all the light-emitting elements 191E of the luminescent devices 191L and 191R emit light in one color (e.g. green).

Figure 7:
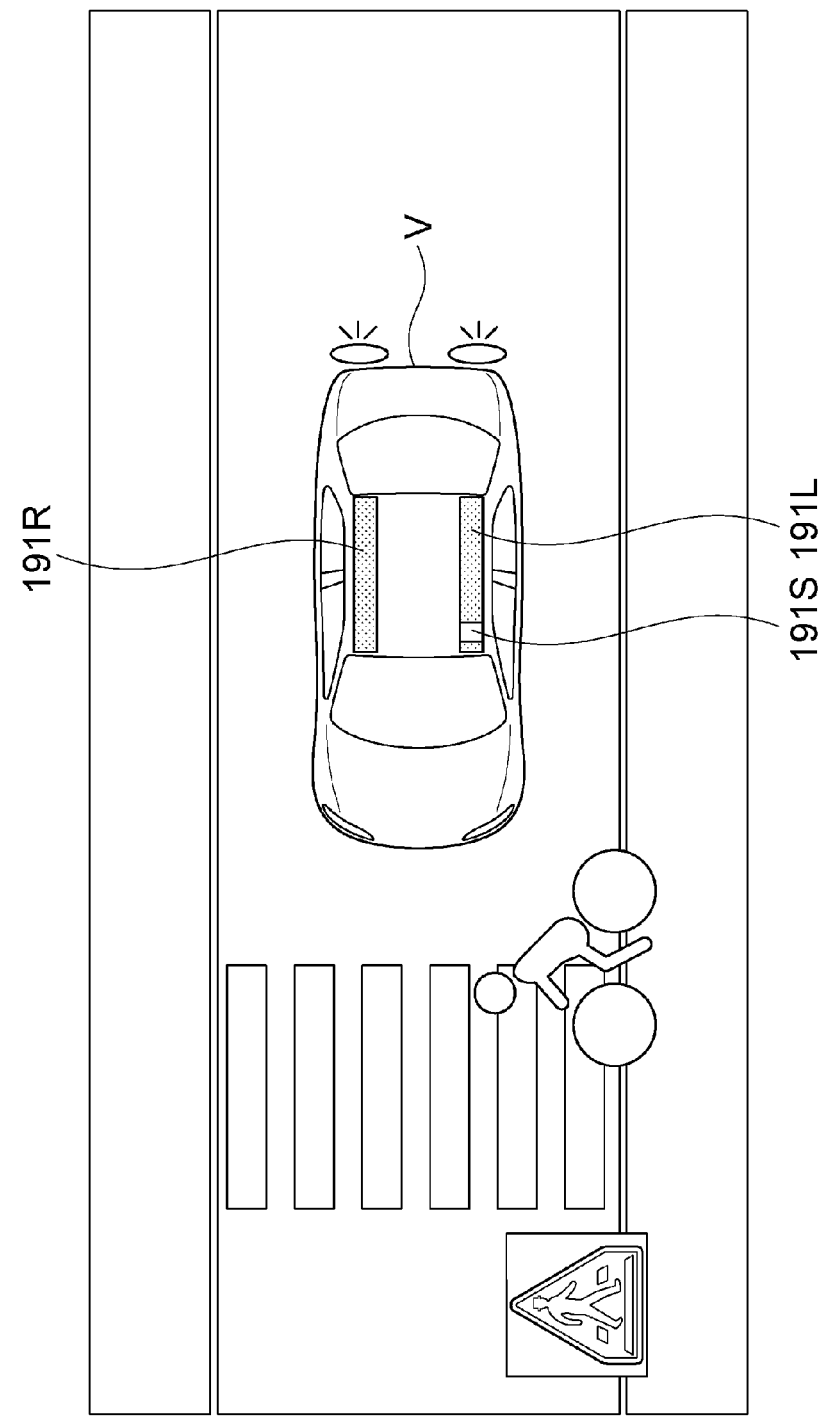
FIG. 7 is a plan view illustrating an example of a situation in which light-emitting elements of a spot luminescent part of the luminescent devices are controlled to emit light in a color different from the color of other parts.

FIG. 7 is a plan view illustrating an example of a situation in which the light-emitting elements 191E of a part (referred to as a "spot luminescent part," hereinafter) 191S of the luminescent devices 191L and 191R are controlled to emit light in a color different from the color of other parts of the light-emitting elements 191E. As illustrated in FIG. 7, when a bicycle existing on the left side ahead of the subject vehicle V stopping approaches a pedestrian crossing, this situation is detected using the function of detecting pedestrians etc. of the notification control device 192. In such a case, the notification control device 192 uses the light emission control function to control the light-emitting elements 191E of a spot luminescent part (e.g. a front-end part) 191S of the left-side luminescent device 191L to emit light in a color (e.g. white) different from the color of other parts (e.g. green). In such a case, the spot luminescent part 191S of the luminescent device 191L may be blinked or moved in the vehicle's front-back direction.

Figure 8:
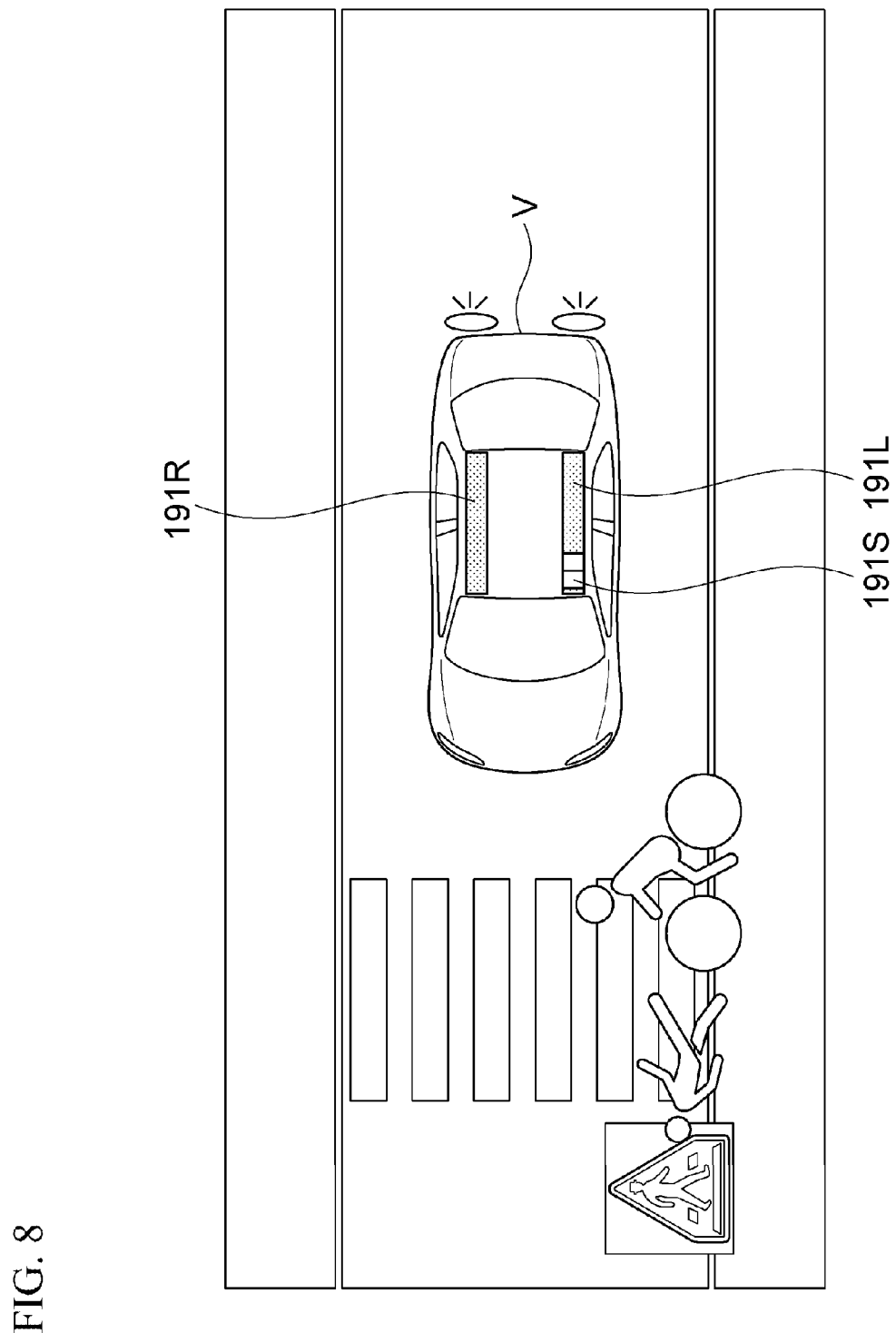
FIG. 8 is a plan view illustrating an example of a situation in which the light-emitting elements of a spot luminescent part of the luminescent devices are controlled to emit light in a color different from the color of other parts.

FIG. 8 is a plan view illustrating an example of a situation in which the light-emitting elements 191E of a spot luminescent part 191S of the luminescent devices 191L and 191R are controlled to emit light in a color different from the color of other parts of the light-emitting elements 191E. As illustrated in FIG. 8, when a pedestrian and a bicycle existing on the left side ahead of the subject vehicle V stopping approach a pedestrian crossing, this situation is detected using the function of detecting pedestrians etc. of the notification control device 192. In such a case, the notification control device 192 uses the light emission control function to control the light-emitting elements 191E of a spot luminescent part (e.g. a front end part) 191S of the left-side luminescent device 191L to emit light in a color (e.g. white) different from the color of other parts (e.g. green). In such a case, the range (e.g. length in the vehicle's front-back direction) of the spot luminescent part 191S is set wider than that in the situation illustrated in FIG. 7.

Figure 9:
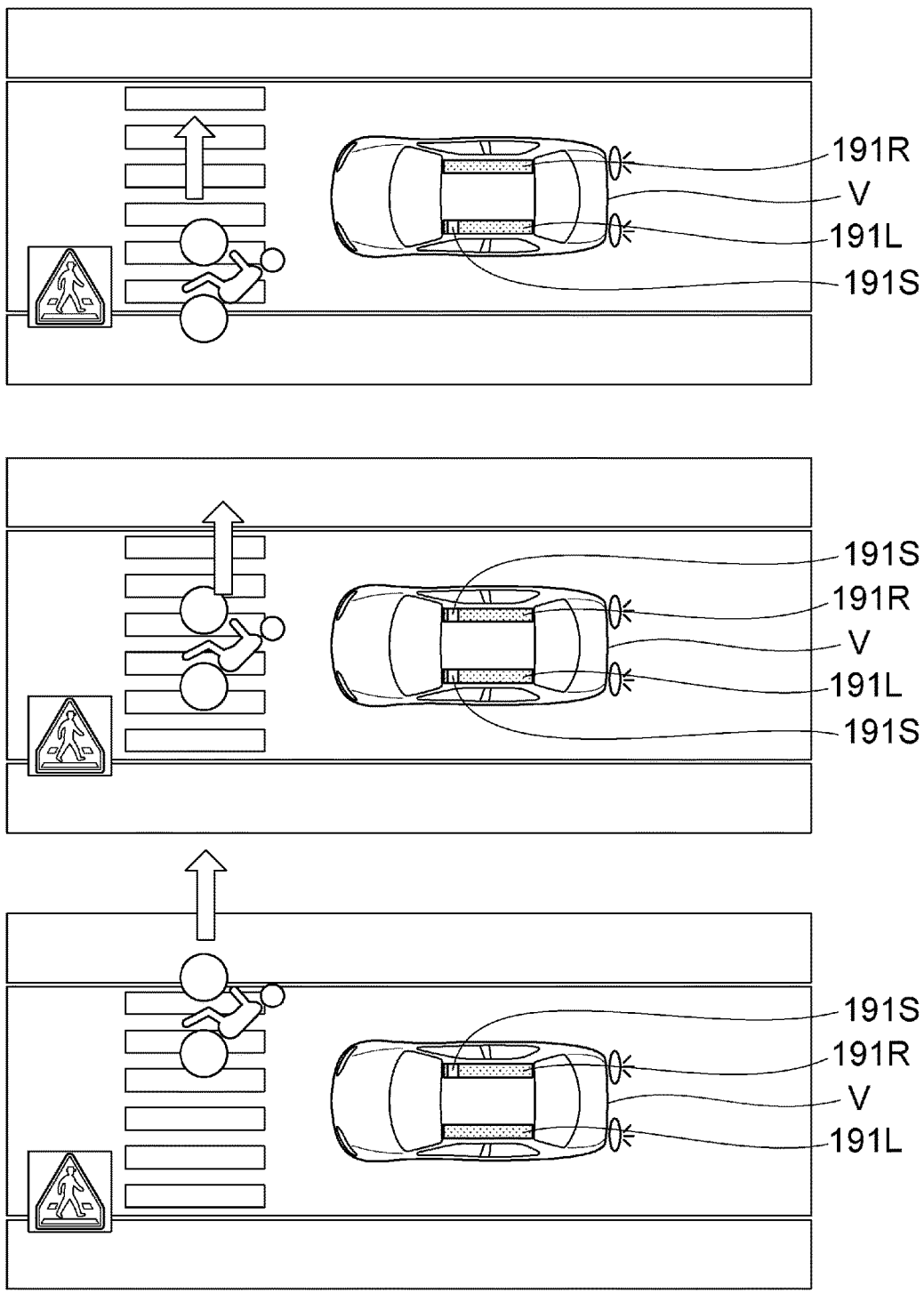
FIG. 9 is a set of plan views each illustrating an example of a situation in which the light-emitting elements of one or more spot luminescent parts of the luminescent devices are controlled to emit light in a color different from the color of other parts.

FIG. 9 is a set of plan views each illustrating an example of a situation in the light-emitting elements 191E of one or more spot luminescent parts 191S of the luminescent devices 191L and 191R are controlled to emit light in a color different from the color of other parts of the light-emitting elements 191E. As illustrated in FIG. 9, when a bicycle detected on the left side ahead of the subject vehicle V stopping crosses a pedestrian crossing to move to the right side ahead of the subject vehicle V, this situation is detected using the function of detecting pedestrians etc. of the notification control device 192. In such a case, first, the notification control device 192 uses the light emission control function to control the light-emitting elements 191E of a spot luminescent part (e.g. a front-end part) 191S of the left-side luminescent device 191L to emit light in a color (e.g. white) different from the color of other parts (e.g. green). Then, the notification control device 192 uses the light emission control function to control the light-emitting elements 191E of spot luminescent parts (e.g. front-end parts) 191S of the right and left luminescent devices 191L and 191R to emit light in a color different from the color of other parts. Finally, the notification control device 192 uses the light emission control function to control the light-emitting elements 191E of a spot luminescent part (e.g. a front-end part) 191S of the right-side luminescent device 191R to emit light in a color different from the color of other parts (e.g. green). That is, the positions of the spot luminescent parts 191S change in accordance with the movement of the detected bicycle.

Figure 10:
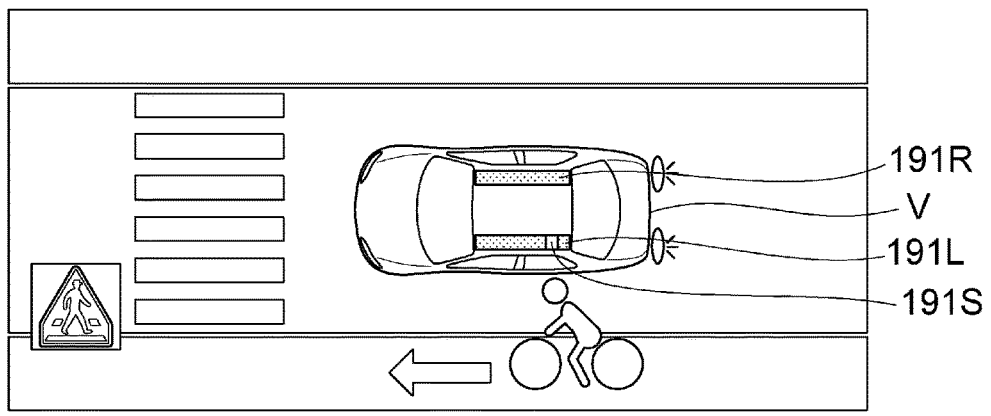
FIG. 10 is a set of plan views each illustrating an example of a situation in which the light-emitting elements of a spot luminescent part of the luminescent devices are controlled to emit light in a color different from the color of other parts.
Figure 10:
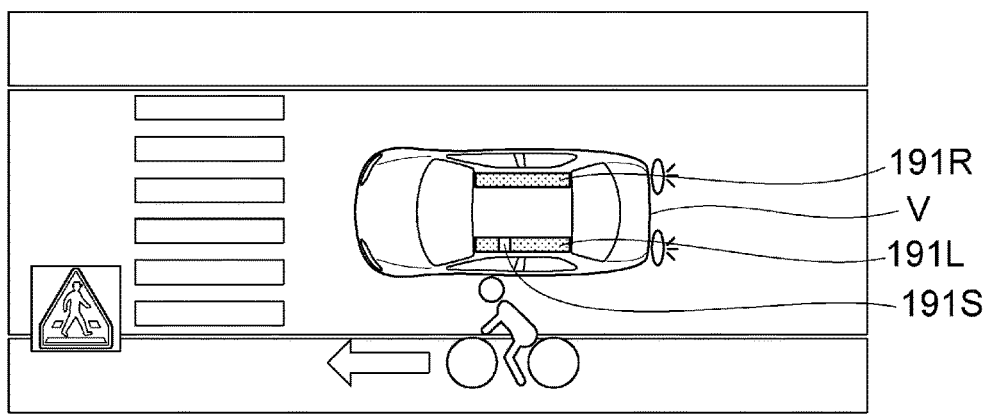
Figure 10:
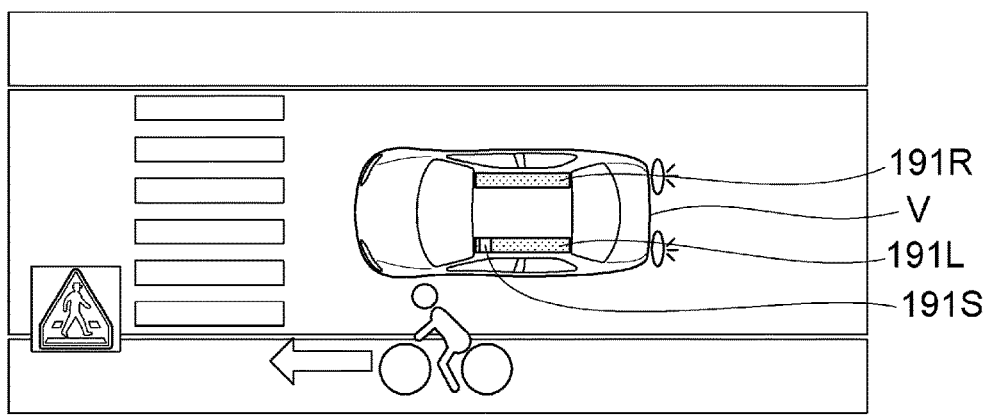

FIG. 10 is a set of plan views each illustrating an example of a situation in the light-emitting elements 191E of a spot luminescent part of the luminescent devices 191L and 191R are controlled to emit light in a color different from the color of other parts of the light-emitting elements 191E. As illustrated in FIG. 10, when a bicycle detected on the left side of the subject vehicle V stopping moves in the travel direction of the subject vehicle V, this situation is detected using the function of detecting pedestrians etc. of the notification control device 192. In such a case, the notification control device 192 uses the light emission control function to control a rear-side spot luminescent part 191S of the left-side luminescent device 191L to emit light in a color (e.g. white) different from the color of other parts (e.g. green), and the position of the spot luminescent part 191S is moved forward in accordance with the movement of the detected bicycle.

The display function of the notification control device 192 will then be described. The display function of the notification control device 192 is a function of displaying the luminescent state of the luminescent devices 191L and 191R controlled using the light emission control function of the notification control device 192 and the pedestrian, bicycle, etc. detected using the function of detecting pedestrians etc. of the notification control device 192 on the display 151.

Figure 11:
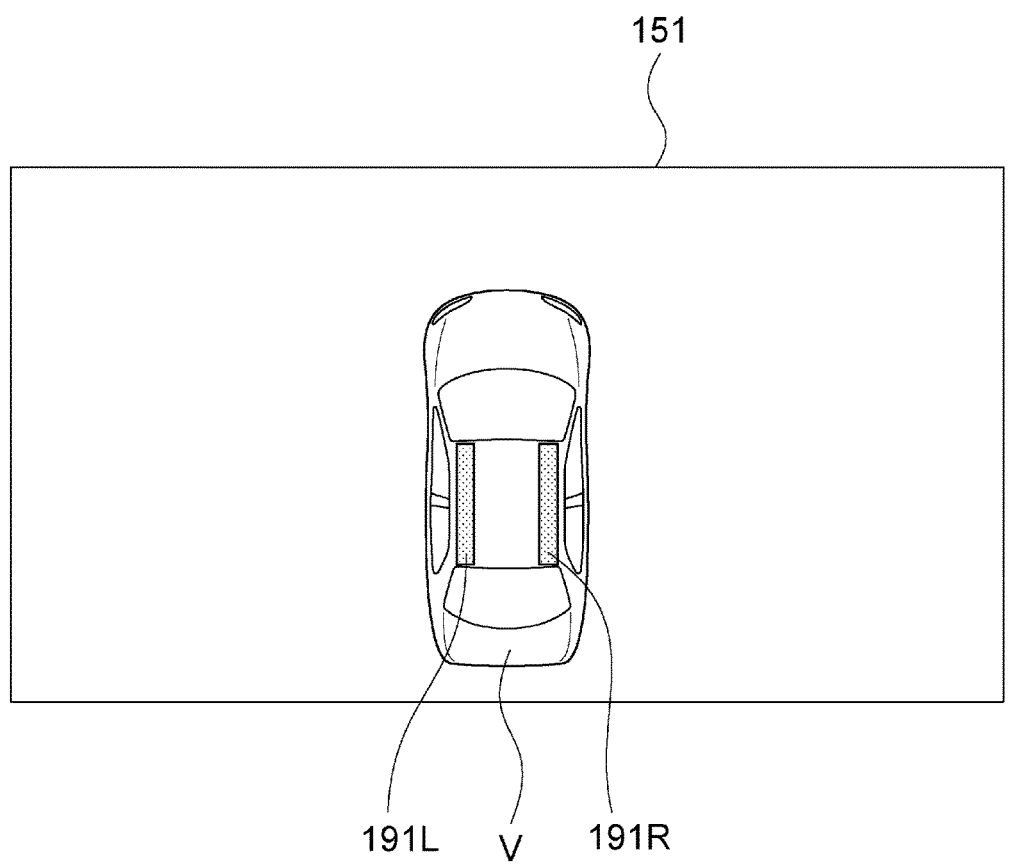
FIG. 11 is a view illustrating a display example of a display.
Figure 12:
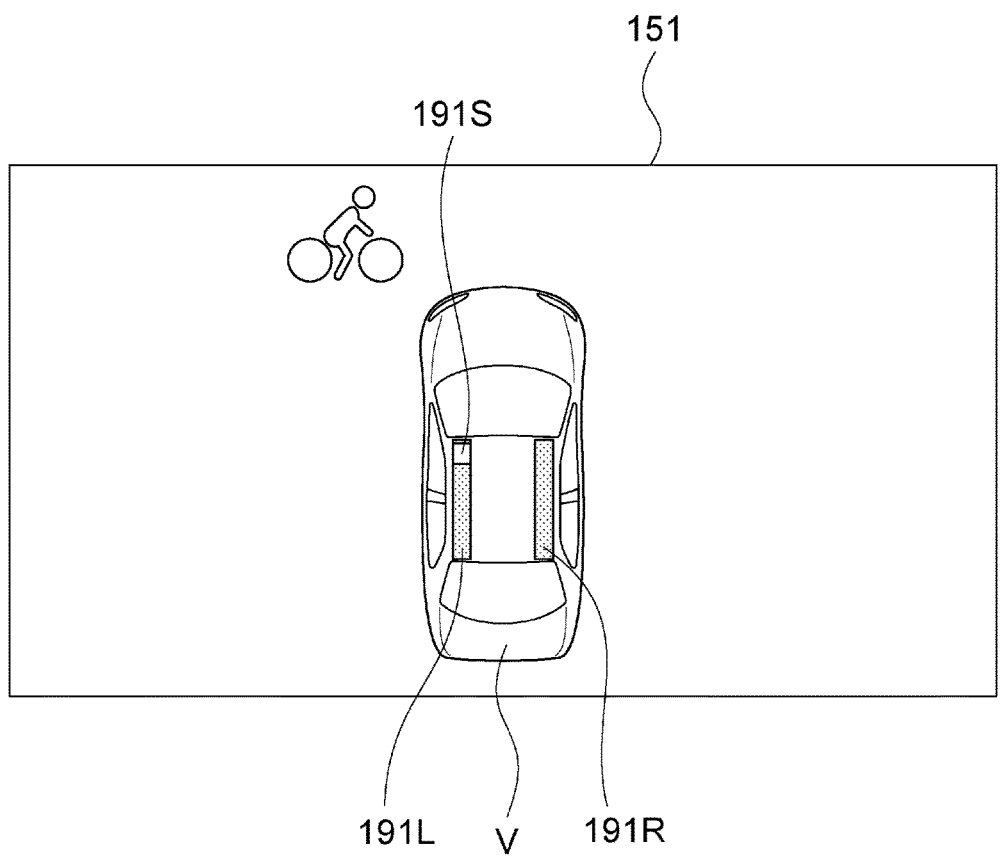
FIG. 12 is a view illustrating a display example of the display.
Figure 13:
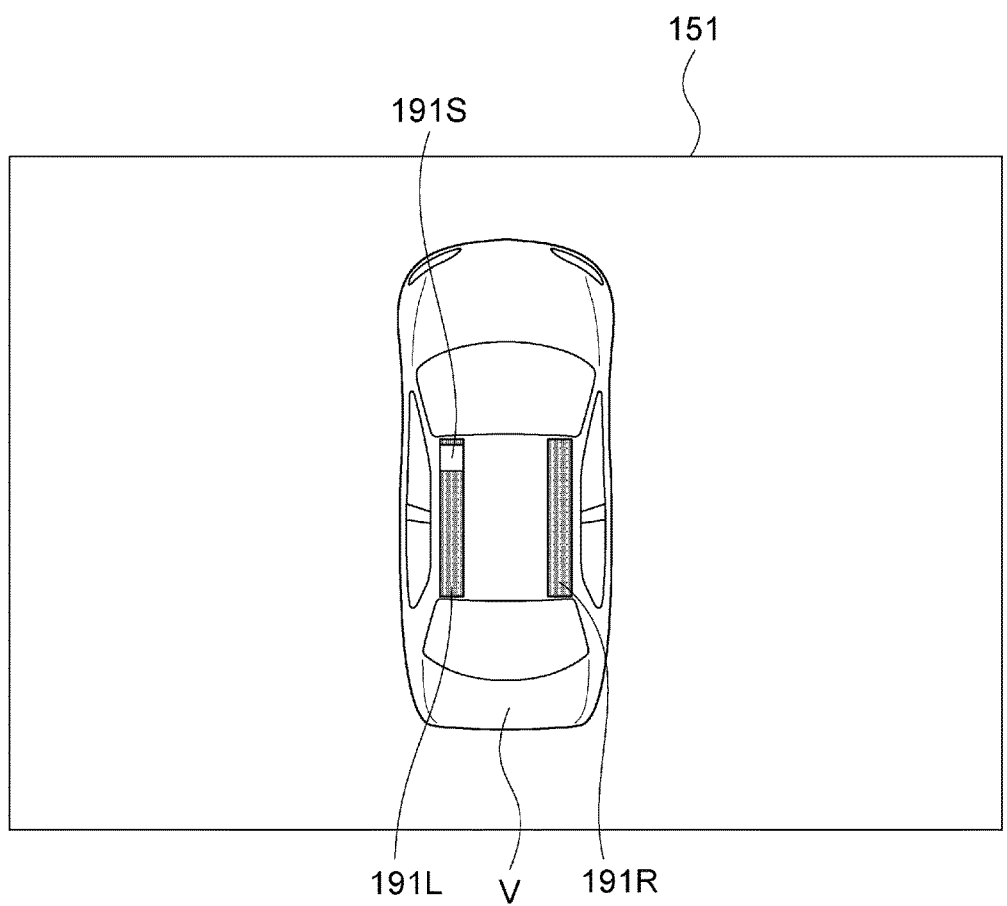
FIG. 13 is a view illustrating a display example of the display.

FIGS. 11 to 13 are views illustrating display examples of the display 151. FIG. 11 illustrates an example of a case in which a pedestrian, bicycle or the like is detected while the subject vehicle V is traveling. As illustrated in FIG. 11, when the notification control device 192 uses the function of detecting pedestrians etc. to detect a pedestrian or the like during travel of the subject vehicle V, the notification control device 192 uses the display function to display an image of the subject vehicle V on the display 151. This image is in a state in which the entire luminescent devices 191L and 191R emit light in the same color (e.g. green).

FIG. 12 illustrates an example of a case in which a pedestrian, bicycle or the like is detected while the subject vehicle V is not traveling. As illustrated in FIG. 12, when the notification control device 192 uses the function of detecting pedestrians etc. to detect a pedestrian or the like during stop of the subject vehicle V, the notification control device 192 uses the display function to display an image of the subject vehicle V on the display 151. This image is in a state in which the spot luminescent part 191S of the luminescent devices 191L and 191R emits light in a color (e.g. white) different from the color of other parts (e.g. green).

FIG. 13 illustrates an example of a case in which the subject vehicle V ends the stop state. As illustrated in FIG. 13, when the subject vehicle V ends the stop state, the notification control device 192 uses the display function to display an image of the subject vehicle V on the display 151. This image is in a state in which large portions of the luminescent devices 191L and 191R (e.g. portions emitting light in green color except the spot luminescent part 191S emitting light in white color) are blinked.

Figure 14:
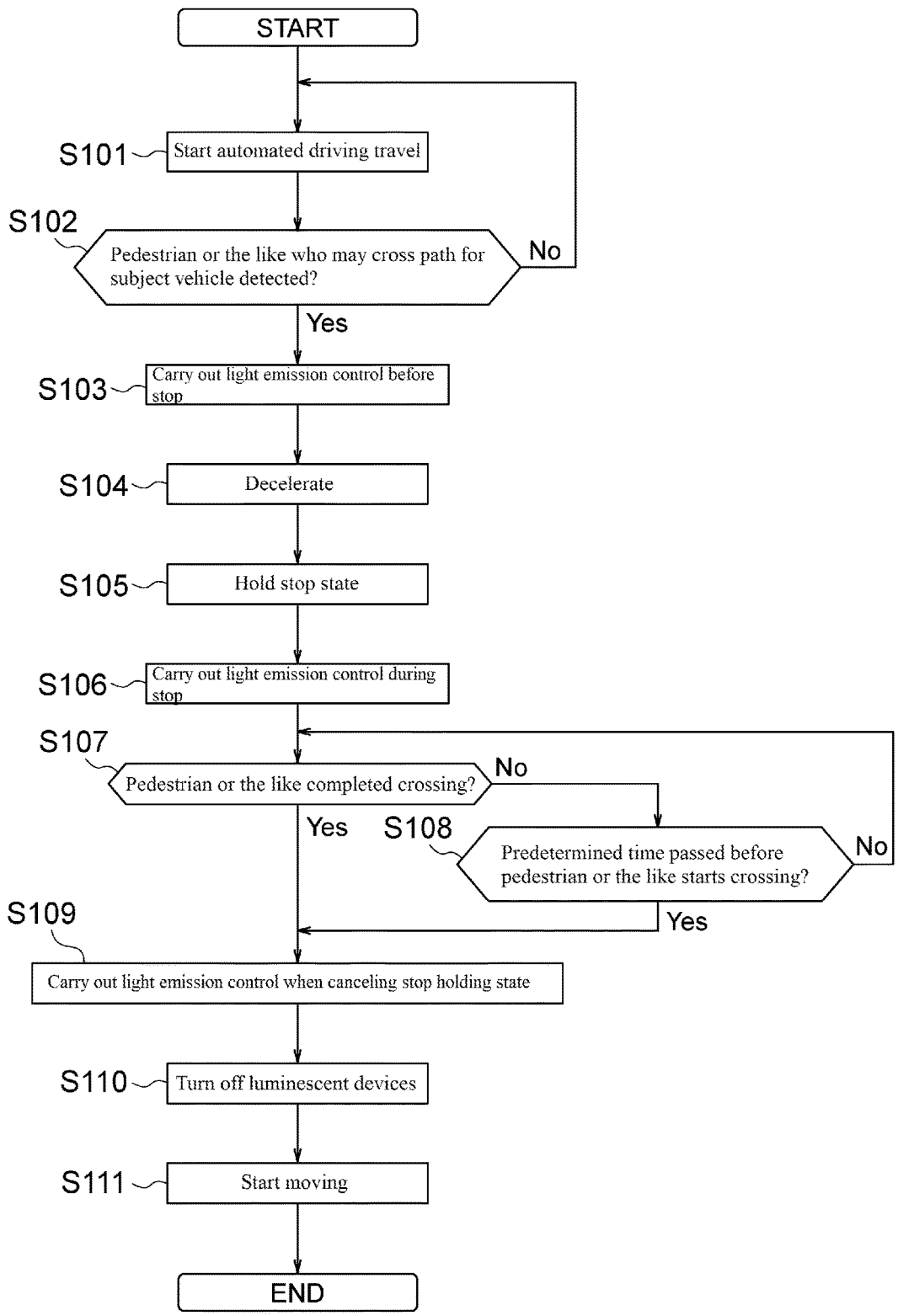
FIG. 14 is a flowchart illustrating a travel control process and a light emission control process according to one or more embodiments of the present invention.

The travel control process and the light emission control process will now be described with reference to FIG. 14. FIG. 14 is a flowchart illustrating the light emission control process. The travel control process described below is executed by the control device 200 while the light emission control process is executed by the notification control device 192. The travel control process and light emission control process described below are started when the automated driving switch 161 is turned on.

First, in step S101, the control device 200 uses the travel control function to start the automated driving travel. Specifically, the control device 200 uses the travel control function to monitor the current travel state of the subject vehicle V on the basis of the information from the front camera 111, rear camera 112, front radar 113, rear radar 114, left-side radar 115, right-side radar 116, vehicle speed sensor 117, navigation device 142, and communication device 170 and control the steering 141, engine 183, transmission 184, brake 185, and other necessary components.

When the automated driving travel is started, as illustrated in FIG. 5, the notification control device 192 uses the light emission control function to turn off the luminescent devices 191L and 191R.

In step S102, the notification control device 192 uses the light emission control function to determine whether or not a pedestrian, bicycle or the like which may cross the path for the subject vehicle V is detected using the function of detecting pedestrians etc. Specifically, a determination is made as to whether or not any of the following conditions (1) to (2) is met.

(1) A condition that a pedestrian or bicycle standing toward a direction of crossing the road ahead of the subject vehicle V or a pedestrian or bicycle moving in a direction of crossing the road ahead of the subject vehicle V is detected on the basis of the information from the front camera 111 and/or the communication device 170.

(2) A condition that a pedestrian or bicycle traveling in the travel direction of the subject vehicle V is detected on the basis of the information from the left-side radar 115, right-side radar 116, rear radar 114, rear camera 112, and/or communication device 170.

(3) A condition that a pedestrian or bicycle existing in the vicinity of a pedestrian crossing or stop line ahead of the subject vehicle V is detected on the basis of the information from the front radar 113 and/or the communication device 170.

(4) A condition that a vehicle stopping while blinking winkers ahead of the subject vehicle V is detected on the basis of the information from the front radar 113 and/or the communication device 170.

When a pedestrian, bicycle or the like which may cross the path for the subject vehicle V is not detected, the determination in step S102 is repeated. When a pedestrian, bicycle or the like which may cross the path for the subject vehicle V is detected, the routine proceeds to step S103.

In step S103, the notification control device 192 uses the light emission control function to perform light emission control before the subject vehicle V stops. Specifically, as illustrated in FIG. 6, the light emission control function serves to turn on all the light-emitting elements 191E of the luminescent devices 191L and 191R thereby to notify the pedestrian or the like, who may cross the path for the subject vehicle V, that the subject vehicle V will stop. On this occasion, as illustrated in FIG. 11, the notification control device 192 may use the display function to control the display 151 to display an image of the subject vehicle V in a state in which the entire luminescent devices 191L and 191R emit light in one color.

The travel direction of the subject vehicle V is not limited to the forward direction and may also be the backward direction. The travel of the subject vehicle V is not limited to the travel in an urban area and may include the parking operation in a parking lot.

When the traffic signal on the path for the subject vehicle V is a red signal, it is not necessary to notify a pedestrian or the like that the subject vehicle V side recognizes the pedestrian or the like because the pedestrian or the like is not in a situation of being doubt as to whether or not he/she can cross the pedestrian crossing. Thus, when the notification control device 192 uses the function of detecting pedestrians etc. to detect that the traffic signal on the path for the subject vehicle V is a red signal, the notification control device 192 may use the light emission control function to prohibit the light emission of the luminescent devices 191L and 191R.

When the subject vehicle V travels on an expressway or a motorway, no pedestrians and bicycles exist around the subject vehicle V. Thus, when it is detected that the subject vehicle V travels on an expressway or a motorway, such as via the information from the navigation device 142, the notification control device 192 may use the light emission control function to prohibit the light emission of the luminescent devices 191L and 191R.

Step S103 is followed by step S104 in which the control device 200 uses the travel control function to reduce the vehicle speed of the subject vehicle V via the operation of the brake 185. Step S104 is followed by step S105 in which the control device 200 uses the travel control function to maintain the fluid pressure of the brake 185 when the vehicle speed of the subject vehicle V comes to 0 km/h, and the stop state of the subject vehicle V is thereby held.

Step S105 is followed by step S106 in which the notification control device 192 uses the light emission control function to perform emission control during the stop. Specifically, as illustrated in FIG. 7, the light emission control function serves to control the light-emitting elements 191E at the front-end part of the left-side luminescent device 191L to emit light in a color different from the color of other parts, thereby notifying the pedestrian or the like, who may cross the path for the subject vehicle V, that the subject vehicle V stops to give priority to the pedestrian or the like. On this occasion, the notification control device 192 may use the display function to control the display 151 to display an image of the subject vehicle V in a state in which, as illustrated in FIG. 12, the spot luminescent part 191S of the luminescent devices 191L and 191R emits light in a color different from the color of other parts.

Step S106 is followed by step S107 in which the notification control device 192 uses the light emission control function to determine whether or not the pedestrian, bicycle or the like completes crossing the path for the subject vehicle V. When a determination is made that crossing is not completed, the routine proceeds to step S108. When a determination is made that crossing is completed, the routine proceeds to step S109.

In step S108, the notification control device 192 uses the light emission control function to determine whether or not a predetermined time has passed before the pedestrian or the like starts crossing. When a determination is made that the predetermined time has not passed, the routine returns to step S106 to continue the light emission control during the stop. When a determination is made that the predetermined time has passed, the routine proceeds to step S109.

Here, the predetermined time until a pedestrian or the like starts crossing may be a constant value or may also be a variable time. In the case of a variable predetermined time, the predetermined time may be set in accordance with the weather, detection object, scale of a road, or other appropriate factors. In the case of setting the predetermined time in accordance with the weather, for example, the situation of rain may be detected when the wiper operates, or the situation of snow may be detected when the ABS operates. When setting the predetermined time in accordance with the weather, in a situation of rain or snow, for example, it can be considered that the pedestrian or bicycle moves slowly, so the predetermined time may be set longer than that in the situation of clear weather. Conversely, in a situation of rain or snow, it can otherwise be considered that the pedestrian or bicycle wants to cross rapidly, so the predetermined time may be set shorter than that in the situation of clear weather.

When setting the predetermined time in accordance with a detection object, for example, whether the object is a pedestrian or a bicycle or the size of a pedestrian may be detected on the basis of the image captured by the front camera 111 or rear camera 112. When setting the predetermined time in accordance with a detection object, for example, it can be considered that a bicycle can cross rapidly as compared with a pedestrian, so when the detection object is a bicycle, the predetermined time may be set shorter than that in the case in which the detection object is a pedestrian. When setting the predetermined time in accordance with a detection object, for example, it can be considered that a child requires a longer time to cross than an adult, so when the body of a pedestrian as the detection object is smaller than an average, the predetermined time may be set longer than that in the case in which the body of a pedestrian as the detection object is not smaller than the average.

When setting the predetermined time in accordance with the scale of a road, for example, the width of the road may be detected on the basis of the image captured by the front camera 111, or the road type may be detected on the basis of the information from the navigation device 142. When setting the predetermined time in accordance with the scale of a road, for example, it can be considered that the time required for crossing increases as the road width is wider, so the predetermined time may be set longer as the road width is wider. When setting the predetermined time in accordance with the scale of a road, for example, it can be considered that a major road requires a longer time as compared with a minor road, so when the road type is a major road, the predetermined time may be set longer than that in the case of a minor road. The major road refers to a road, among connecting roads, on which the designed speed is higher, or a road with a larger traffic volume if the designed speed is the same.

Referring again to the flowchart, in step S109, the notification control device 192 uses the light emission control function to perform light emission control when a stop holding state of the subject vehicle V is canceled. Specifically, a pedestrian or the like who may cross the path for the subject vehicle V is notified that the stop holding state of the subject vehicle V will be canceled, such as by changing the light-emitting color of the luminescent devices 191L and 191R (e.g., the color is changed from green to red) and blinking the luminescent devices 191L and 191R. On this occasion, the notification control device 192 may use the display function to display an image of the subject vehicle V on the display 151. This image is in a state in which, as illustrated in FIG. 13, large portions of the luminescent devices 191L and 191R are blinked.

In step S110, the notification control device 192 uses the light emission control function to turn off the luminescent devices 191L and 191R. Step S110 is followed by step S111 in which the control device 200 uses the travel control function to release the brake 185 and control the engine 183 and the transmission 184 so that the subject vehicle V starts moving. The travel control process and the light emission control process are thus completed.

As described above, in the notification device 190 according to one or more embodiments of the present invention, the luminescent devices 191L and 191R provided on the roof of the subject vehicle V emit light thereby to notify a pedestrian or the like existing around the subject vehicle V that the subject vehicle V side recognizes the pedestrian or the like. Thus, not only a pedestrian or the like existing ahead of the subject vehicle V but also a pedestrian or the like existing on a side of the subject vehicle V or behind the subject vehicle V can be notified that the subject vehicle V side recognizes the pedestrian or the like.

In the notification device 190 according to one or more embodiments of the present invention, the luminescent devices 191L and 191R comprising the light-emitting element arrays 191A are provided so as to extend in the vehicle's front-back direction on both sides in the vehicle's width direction of the roof of the subject vehicle V. This allows the luminescent devices 191L and 191R to emit light in a pattern in accordance with the position of a pedestrian or the like existing around the subject vehicle V. The pedestrian or the like can therefore be notified not only that the subject vehicle V side recognizes the pedestrian or the like but also that the subject vehicle V side recognizes the position of the pedestrian or the like.

In the notification device 190 according to one or more embodiments of the present invention, when a pedestrian or the like who exists around the subject vehicle V and may cross the path for the subject vehicle V is detected during travel of the subject vehicle V, the luminescent devices 191L and 191R are controlled to emit light before the subject vehicle V stops. This allows the pedestrian or the like, who may cross the path for the subject vehicle V, to be notified that the subject vehicle V will stop.

In the notification device 190 according to one or more embodiments of the present invention, when a pedestrian or the like existing around the subject vehicle V is detected in the stop holding state in which the stop state of the subject vehicle V is held, the luminescent devices 191L and 191R are controlled to emit light in a pattern (e.g. a pattern in which the spot luminescent part 191S emits light in a color different from the color of other parts) different from the pattern (e.g. a pattern in which the entire luminescent devices 191L and 191R emit light in one color) before transition to the stop holding state. This allows the pedestrian or the like existing around the subject vehicle V to be notified that the subject vehicle V stops to give priority to the pedestrian or the like.

In the notification device 190 according to one or more embodiments of the present invention, when the stop holding state of the subject vehicle V is canceled, the luminescent devices 191L and 191R are controlled to emit light in a pattern (e.g. a pattern in which other portions than the spot luminescent part 191S are blinked) different from the pattern (e.g. a pattern in which the spot luminescent part 191S emits light in a color different from the color of other parts) when the stop holding state continues. This allows the pedestrian or the like existing around the subject vehicle V to be notified that the stop holding state of the subject vehicle V will be ended.

In the notification device 190 according to one or more embodiments of the present invention, when a state in which a pedestrian or the like existing around the subject vehicle V does not cross the path for the subject vehicle V continues for a predetermined time while the stop holding state of the subject vehicle V continues, the luminescent devices 191L and 191R are controlled to emit light in a pattern (e.g. a pattern in which other portions than the spot luminescent part 191S are blinked) different from the pattern (e.g. a pattern in which the spot luminescent part 191S emits light in a color different from the color of other parts) before the predetermined time passes. This allows the pedestrian or the like existing around the subject vehicle V to be notified that the stop holding state of the subject vehicle V will be ended.

In the notification device 190 according to one or more embodiments of the present invention, when a pedestrian or the like existing around the subject vehicle V is detected, the spot luminescent part 191S corresponding to the detected position of the pedestrian or the like is controlled to emit light in a pattern (e.g. a pattern of emitting light in white color) different from the pattern (e.g. a pattern of emitting light in green color) of other positions than the spot luminescent part 191S. This allows the pedestrian or the like to be notified that the subject vehicle V side recognizes the position of the pedestrian or the like.

In the notification device 190 according to one or more embodiments of the present invention, when movement of a pedestrian or the like existing around the subject vehicle V is detected, the spot luminescent part 191S is controlled to emit light while moving so that it follows the movement of the pedestrian or the like. This allows the pedestrian or the like to be notified that the subject vehicle V side recognizes the movement of the pedestrian or the like.

In the notification device 190 according to one or more embodiments of the present invention, the state of the luminescent devices 191L and 191R is displayed on the display 151 provided in the vehicle compartment. This allows the driver of the subject vehicle V to be notified that the pedestrian or the like recognizes the subject vehicle V. The driver of the subject vehicle V can therefore readily recognize the behavior of the pedestrian or the like.

The "notification device 190" in the above-described embodiments corresponds to an example of the "vehicular notification device" in the present invention, the "luminescent devices 191L and 191R" in the above-described embodiments correspond to an example of the "luminescent device" in the present invention, the "notification control device 192" in the above-described embodiments corresponds to an example of the "controller" in the present invention, and the "spot luminescent part 191S" in the above-described embodiments corresponds to an example of the "part of the luminescent device" in the present invention.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, the light-emitting element arrays 191A are provided so as to extend in the vehicle's front-back direction on both sides in the vehicle's width direction of the roof of the vehicle, but the present invention is not limited to this configuration, and light-emitting bodies may be provided at the front-end part and rear end part of the roof of the vehicle or at other appropriate parts. In this case, the light-emitting element arrays may be provided at the front-end part and rear end part of the vehicle along the vehicle's width direction or along other appropriate direction.

REFERENCE SIGNS LIST

150 Presentation device
  151 Display
190 Notification device
  191L Luminescent device
  191R Luminescent device
  191S Spot luminescent part
  192 Notification control device

The invention claimed is:
1. A vehicular notification device comprising:
a luminescent device provided on a roof of a vehicle; and
a controller configured to control the luminescent device to emit light when a person existing around the vehicle is detected,
wherein when a traffic signal on a path for the vehicle is a red signal or when the vehicle travels on an expressway or a motorway, the controller prohibits light emission of the luminescent device.

2. The vehicular notification device according to claim 1, wherein when a person existing around the vehicle is detected in a stop holding state in which a stop state of the vehicle is held, the controller controls the luminescent device to emit light in a pattern different from a pattern before the vehicle stops.

3. The vehicular notification device according to claim 2, wherein when the stop holding state is canceled, the controller controls the luminescent device to emit light in a pattern different from a pattern when the stop holding state continues.

4. The vehicular notification device according to claim 2, wherein when a state in which a person existing around the vehicle does not cross a path for the vehicle continues for a predetermined time while the stop holding state continues, the controller controls the luminescent device to emit light in a pattern different from a pattern before the predetermined time passes.

5. The vehicular notification device according to claim 1, wherein when a position of a person existing around the vehicle is detected, the controller controls a part of the luminescent device corresponding to the position to emit light in a pattern different from a pattern of a portion other than the part.

6. The vehicular notification device according to claim 1, comprising
a display device provided in a vehicle compartment of the vehicle,
the controller controlling the display device to display a state of the luminescent device.

7. The vehicular notification device according to claim 1, wherein the luminescent device comprises a plurality of luminescent devices that are provided so as to extend in a vehicle's front-back direction on both sides in a vehicle's width direction of the roof.

8. A vehicular notification device comprising:
a luminescent device provided on a roof of a vehicle; and
a controller configured to control the luminescent device to emit light when a person existing around the vehicle is detected,
wherein when a position of a person existing around the vehicle is detected, the controller controls a part of the luminescent device corresponding to the position to emit light in a pattern different from a pattern of a portion other than the part,
wherein when movement of the person existing around the vehicle is detected, the controller controls the part of the luminescent device to emit light while moving the part so that the part follows the movement of the person.

9. The vehicular notification device according to claim 8, comprising
a display device provided in a vehicle compartment of the vehicle,
the controller controlling the display device to display a state of the luminescent device.

10. The vehicular notification device according to claim 8, wherein the luminescent device comprises a plurality of luminescent devices that are provided so as to extend in a vehicle's front-back direction on both sides in a vehicle's width direction of the roof.

\* \* \* \* \*